Dec. 23, 1952     A. TLUSTOS     2,622,823
CASTING REEL FOR FISHING RODS
Filed July 31, 1947
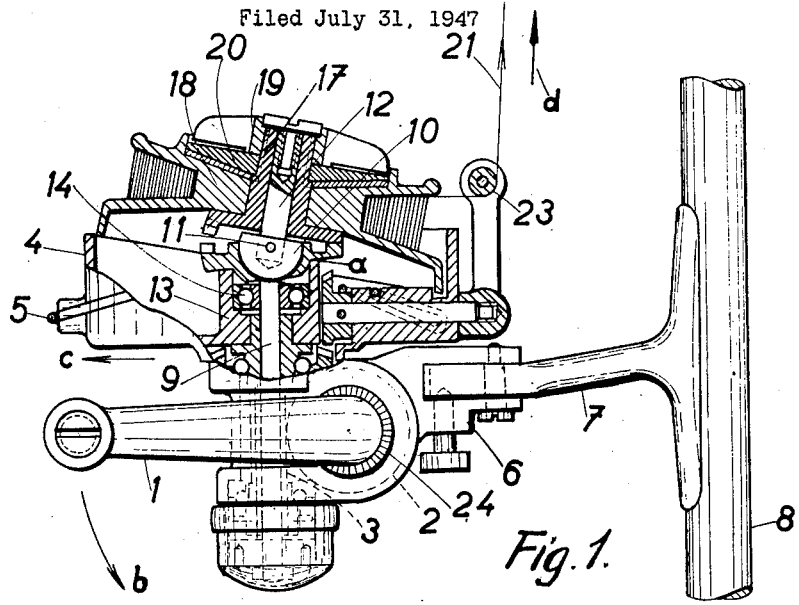
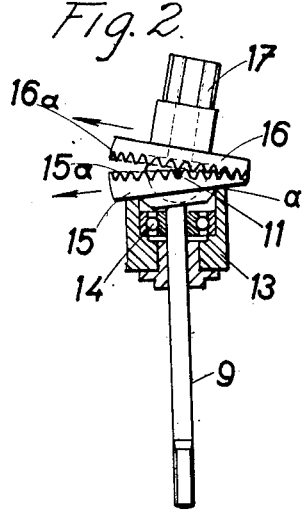
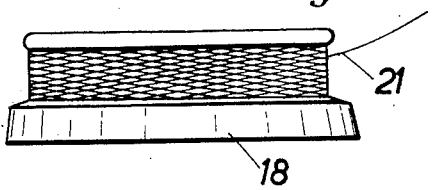
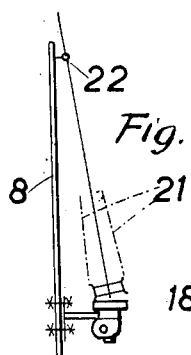
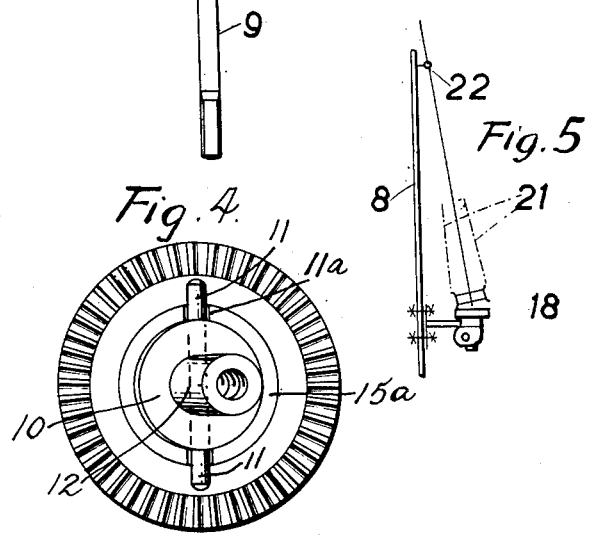
INVENTOR
ADOLPH TLUSTOS
BY
Toulmin & Toulmin
ATTORNEYS Patented Dec. 23, 1952

2,622,823

UNITED STATES PATENT OFFICE 2,622,823

CASTING REEL FOR FISHING RODS

Adolf Tlustoš, Kbely, near Prague, Czechoslovakia

Application July 31, 1947, Serial No. 765,185
In Czechoslovakia June 21, 1945

Section 1, Public Law 690, August 8, 1946
Patent expires June 21, 1965

5 Claims. (Cl. 242—84.4)

This invention relates to and has for its object to provide an improved casting reel for fishing rods.

In most of the casting reels hitherto known, the spool on which the line is wound or unwound, reciprocates along its axis. In a number of other arrangements, the spool does not reciprocate along its axis but, as it is held by a spherical journal with a locking pin, is given a pendulum or rocking motion. In the case of these known reels, the spool uninterruptedly changes its position relatively to the first eyelet on the rod, which causes an uneven braking of the line against the rim of the spool.

It is an object of the present invention to eliminate these drawbacks by so arranging the spool that it always remains in the same position relative to the fishing rod and is aligned with respect to the first eyelet on the fishing rod, the spool rotating slowly about this inclined axis with the result that the line is wound uniformly crosswise on to it so that it cannot cut into the other turns even under excessive pressure.

In the known casting reels with reciprocating spool, in order to ensure a long cast of the bait the line must be cast in such a position of the reel, that the reel is located in the upper position that is to say the position in which it emerges farthest from the casing or holder so that the unwinding line is not hindered in its movements and braked by this rotating casing. Similarly, it is not always possible to rely upon the guard and the guide roller being within reach of the finger intended to hold the line, even when the spool is in the correct position, and to enable the guard to be tilted and the reel made ready for casting the bait.

It is also an object of the present invention to overcome the last mentioned drawback so that the line with the bait can be cast whenever necessary, and the line is always perfectly free on the spool in any position so that particularly long casts are possible even with a light-weight bait.

In order that the invention may be more clearly understood, one particular embodiment thereof will now be described by way of example, with reference to the accompanying drawing wherein, Figure 1 shows the complete casting reel in elevation viewed from the crank side and partly in axial section, Figure 2 shows a detail of Figure 1, Figure 3 shows the cross-wise winding of the line on to the spool, Figure 4 shows a detail of Figure 1 in plain view, Figure 5 shows diagrammatically the mode of operation of a reel in accordance with the invention.

In the embodiment shown the casing 4 is provided with a reversing wire guard 5 of known construction for freeing the reel and line in known manner when casting the line. The casing 4 with the wire guard 5 is driven by the hand crank 1 through a worm wheel 2 and a worm 3 in the normal way, these principal parts being mounted on a holding element 6 which is adapted to tilt in known manner on the support 7 secured to the fishing rod 8.

The worm 3 is hollow and is rotatably mounted on a stationary shaft which carries at its upper end a hemispherical member 10 rigidly secured thereto and provided with a pair of journals and trunnions 11 (see Figure 4), arranged diametrically opposite to each other and seated in corresponding recesses 11a, provided on diametrically opposite sides of a central boss part, 15a of a toothed member 15. Rigidly connected to the hemispherical member 10 is a journal 12 which is arranged with its axis slightly inclined with respect to the axis of the shaft 9 and on which the spool 18 is rotatably mounted.

The bowl shaped casing 4 is provided internally in the center with a boss part 13 in which is mounted a ball bearing 14 on the shaft 9 which passes through said boss. This boss part 13 is provided with an upper inclined surface a on which bears the lower oblique sliding surface of a non-rotatable but rockable toothed member 15 the teeth 15a of which mesh with the teeth 16a of an oppositely disposed rotatable toothed wheel 16 rotatably mounted by means of a central boss part 17 on the journal 12 in such a manner that the two sets of teeth 15a and 16a are only obliquely in mesh with each other over a part of their periphery to the extent of only a few teeth at a time as shown in Figure 2. The sets of teeth 15a and 16a are of unequal number, the lower toothed member 15 having for example 25 teeth and the upper toothed wheel 16 having only 24 or 23 teeth according to the speed ratio required of these gearing ratios of 25:24 or 25:23. Mounted on the boss 17 of the upper toothed wheel 16 is the spool 18 which is secured on the boss 17 by means of a wing nut 19 below which is provided a suitable friction washer 20 of felt in order to enable the spool 18 to rotate on the boss 17 in the event of an excessive strain being exerted on the line 21.

From the arrangement described, it will be apparent that, if the crank 1 of the reel is turned (with the left hand) in the direction of the arrow b, the casing 4 with the guard 5 will turn in the direction of the arrow c during which time, however, the spool 18 will be given a slower movement of rotation owing to the relative meshing of the two sets of teeth 15a and 16a, the axes of the said casing and spool maintaining a constant obliquity with respect to the first eyelet 22 on the fishing rod 8, as shown in Fig. 5. The purpose of this slower rotation is to enable the line 21 to be wound cross-wise onto the preceding layers on the spool 18 (Figure 3), without thereby altering its unwinding position relative to the first eyelet 22 on the fishing rod 8 in the direction of the arrow d.

At the same time the line is guided over a pulley 23 on the rigid arm of the casing 4 in the zone of movement of the adjusting wire guard 5.

On the spindle of the operating crank 1, a nut 24 is advantageously provided to permit of readily and easily securing the components in the desired inoperative position. This means permits the hooking of a fish without having to wind the reel or hold the crank, as is necessary in some reels. The fish may strike in an unguarded moment when fractions of a second count, so that no time is left for holding the crank with the other hand or this fails to succeed for some other reason. Fishermen improvise by securing the crank to the fishing rod with a rubber ring and releasing it after the fish has been hooked.

The nut 24 is suitably provided with a left hand thread, so that after the line has been cast the nut can be tightened with two fingers of one hand. A slight movement of the crank is sufficient to release the nut again.

What I claim and desire to secure by Letters Patent is:

1. A casting reel for fishing rods, comprising in combination, a rotatable element having an inclined surface, a first toothed member slidably engaged by said inclined surface, means associated with said first toothed member for preventing rotation thereof, said first toothed member being provided with a spherical surface, a shaft arranged at an angle with regard to the axis of rotation of said rotatable element and provided with a member having a spherical area in engagement with said spherical surface, a second toothed member obliquely meshing with said first toothed member and rotatably mounted on said shaft, and a reel rotatably connected to said second toothed member.

2. A casting reel for fishing rods comprising in combination, a shaft composed of a first section and a second section arranged at an angle to said first section, said shaft being provided with a spherical portion, means for preventing rotation of said shaft, a rotatable element rotatably arranged around said first section, said rotatable element being provided with an inclined surface, a first toothed member supported and slidably engaged by said inclined surface, said toothed member being provided with a spherical area slidably engaging said spherical portion, means associated with said spherical portion for preventing rotation of said first toothed member around the axis of rotation of said rotatable member, a reel rotatably mounted about said second section, and a second toothed member associated with said reel and rotatable in unison therewith about said second section, said second toothed member being arranged at an angle with regard to said first toothed member so as only partially to mesh therewith.

3. A casting reel for fishing rods comprising in combination, a shaft, means for preventing rotation of said shaft, a rotatable member rotatable about said shaft, said rotatable member being provided with an inclined surface, manually operable means operatively connected with said rotatable member for rotating the latter, a second shaft having its axis inclined to the axis of said first shaft, said second shaft having connected thereto a spherical member, means associated with said spherical member for preventing rotation of said second shaft, a first toothed member slidably engaged by the inclined surface of said rotatable member and rockably engaging said spherical member so as to be adapted to rock with regard to said spherical member, means for preventing rotation of said first toothed member about the axis of said first shaft, a second toothed member rotatably mounted on said second shaft and arranged for partial engagement only with said first toothed member, and a reel associated with said second toothed member so as to rotate therewith about said second shaft.

4. A casting reel for fishing rods comprising in combination, a shaft, means for preventing rotation of said shaft, a rotatable member rotatable about said shaft, said rotatable member being provided with an inclined surface, manually operable means operatively connected with said rotatable member for rotating the latter, a second shaft having its axis inclined to the axis of said first shaft, said second shaft having connected thereto a spherical member, means associated with said spherical member for preventing rotation of said second shaft, a first toothed member slidably engaged by the inclined surface of said rotatable member and rockably engaging said spherical member so as to be adapted to rock with regard to said spherical member, means for preventing rotation of said first toothed member about the axis of said first shaft, a second toothed member rotatably mounted on said second shaft and arranged for partial engagement only with said first toothed member, and a reel frictionally engaged by said second toothed member so as normally to rotate in unison therewith, said frictional engagement allowing relative movement of said reel to said second toothed member in response to a predetermined force exerted upon said reel.

5. A casting reel for fishing rods comprising in combination, a rotatable element having an inclined surface, manually operable means associated with said rotatable element for rotating the same, a wobble gear slidably supported by said inclined surface and provided with a spherical surface, a shaft arranged at an angle with regard to the axis of rotation of said rotatable element and provided with a ball shaped member for sliding engagement with the spherical surface of said wobble gear, means associated with said wobble gear for preventing rotation thereof about the axis of rotation of said rotatable element, a toothed member rotatably mounted about said shaft for partially meshing only with said wobble gear, and a reel operatively connected to said toothed member for rotation in unison therewith.

ADOLF TLUSTOŠ.

REFERENCES CITED

The following references are of record in the file of this patent:

FOREIGN PATENTS

| Number | Country | Date |
|--------|---------|------|
| 262,194 | Switzerland | June 30, 1949 |
| 437,502 | Great Britain | Oct. 30, 1935 |
| 887,928 | France | Nov. 26, 1943 |